Jan. 1, 1963  K. GEBELE  3,071,057
PRESELECTION DIAPHRAGM STRUCTURE FOR PHOTOGRAPHIC CAMERAS
Original Filed Sept. 27, 1956  2 Sheets-Sheet 1
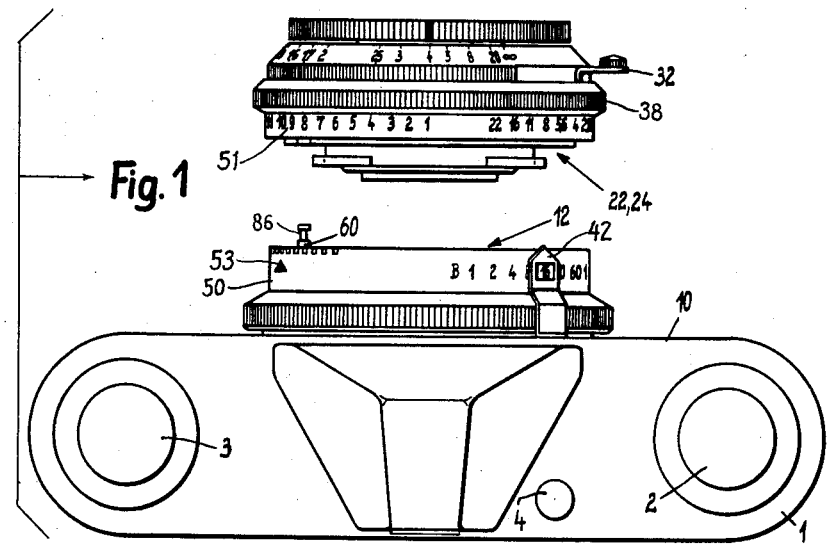
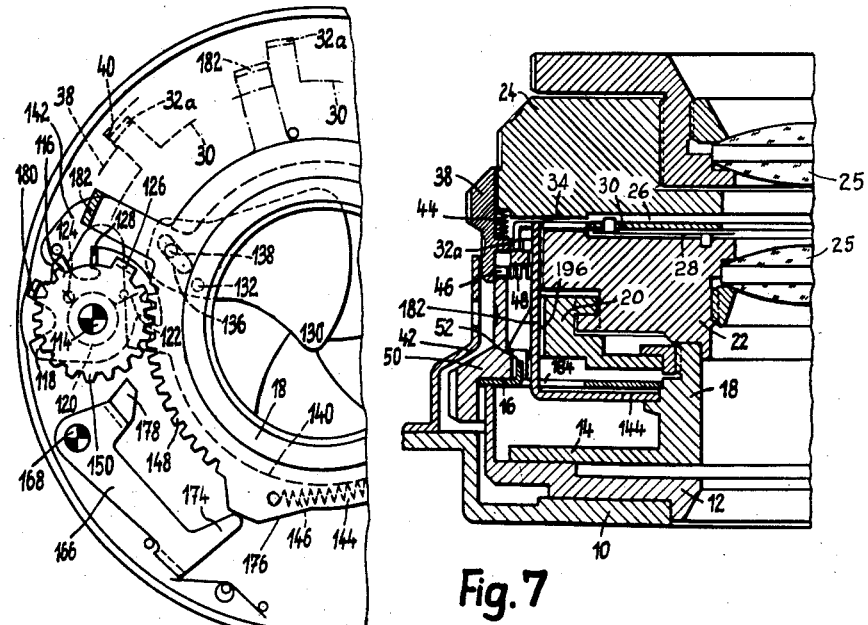

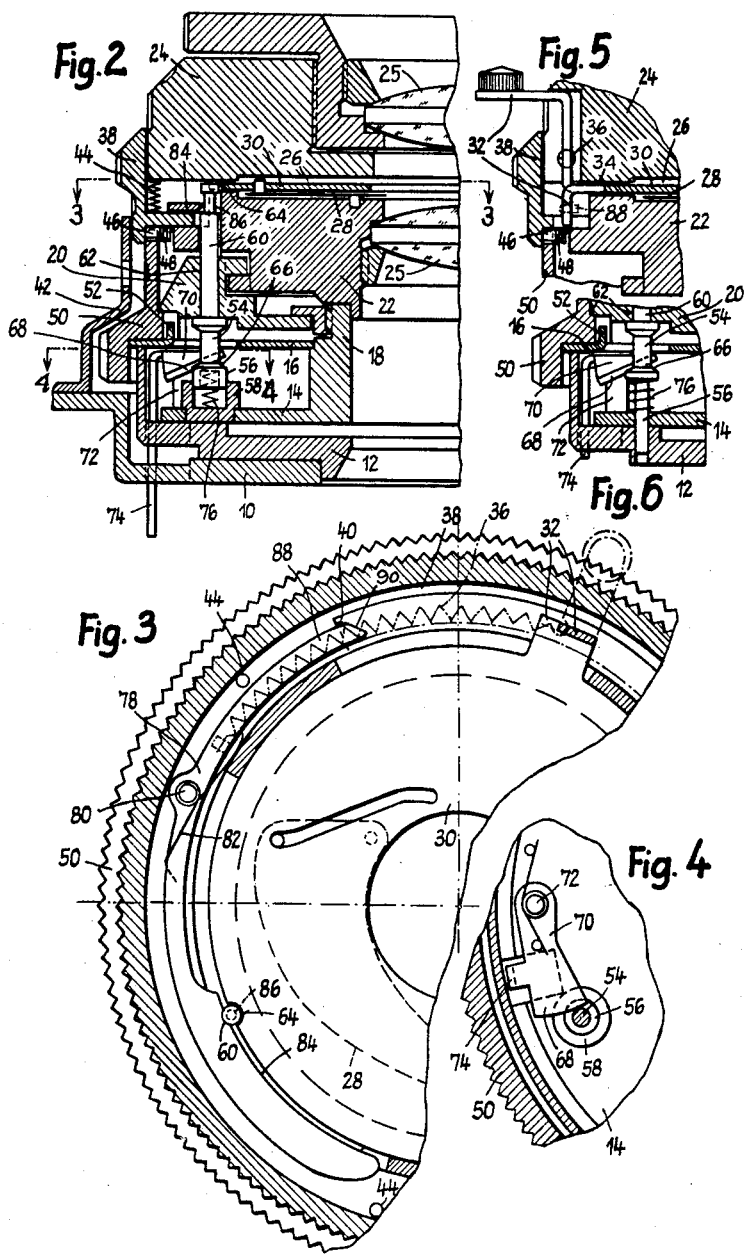

United States Patent Office 3,071,057
Patented Jan. 1, 1963

3,071,057
PRESELECTION DIAPHRAGM STRUCTURE FOR PHOTOGRAPHIC CAMERAS
Kurt Gebele, Munich, Germany, assignor, by mesne assignments, to Compur-Werk Friedrich Deckel oHG, Munich, Germany, a firm of Germany
Original application Sept. 27, 1956, Ser. No. 612,465, now Patent No. 2,967,472, dated Jan. 10, 1961. Divided and this application Nov. 21, 1960, Ser. No. 70,679
Claims priority, application Germany Sept. 29, 1955
5 Claims. (Cl. 95—64)

This invention relates to a preselection diaphragm for photographic cameras of the type in which the diaphragm is in an interchangeable lens unit detachable from and replaceable on a shutter unit.

In certain types of cameras, particularly single lens reflex cameras, it is desirable to have the shutter blades and the diaphragm leaves fully open to their respective maximum apertures, when focusing the camera, access of light to the film being prevented at this time by suitable means such as the reflex mirror. When focusing is completed and the picture is to be taken, the shutter blades are closed prior to moving the mirror to picture-taking position, and it is desirable to close down the diaphragm leaves to a previously determined or previously selected aperture, before the shutter blades are again opened to make the actual exposure. Hence a diaphragm of this kind may be referred to as a preselection diaphragm, meaning that after the diaphragm leaves have been opened to maximum aperture for focusing, they are closed down again to the previously selected aperture, before the picture is taken, without further special attention on the part of the operator.

An object of the invention is the provision of a generally improved and more satisfactory structure of this kind.

Another object is the provision of diaphragm mechanism mounted in an interchangeable unit and coupled by simple means to a shutter unit on which the interchangeable unit is mounted, the coupling means being so constructed that the diaphragm is moved to its preselected position before the shutter blades are opened to make the exposure.

Still another object is the provision of coupling means between the interchangeable unit and the shutter unit, so designed that the coupling means becomes fully effective for its intended purpose, no matter in what position or condition the diaphragm may happen to be at the time that the interchangeable unit carrying the diaphragm is mounted on the shutter unit.

These and other desirable objects may be attained in the manner disclosed as an illustrative embodiment of the invention in the following description and in the accompanying drawings forming a part hereof, in which:

FIG. 1 is a plan of a camera equipped with a shutter unit and an interchangeable lens and diaphragm unit, the latter unit being shown slightly separated from the shutter unit in a position assumed when being placed on or taken off of the shutter unit.

FIG. 2 is a fragmentary radial section through a portion of the camera body, the shutter unit, and the interchangeable lens and diaphragm unit, the section being taken along the optical axis;

FIG. 3 is a fragmentary section through the same, taken perpendicular to the optical axis approximately on the line 3—3 of FIG. 2;

FIG. 4 is a fragmentary transverse section approximately on the line 4—4 of FIG. 2;

FIG. 5 is a fragmentary radial section similar to a portion of FIG. 2 but taken on a different radius, illustrating additional details;

FIG. 6 is a view similar to a fragment of FIG. 2, illustrating a slightly modified construction;

FIG. 7 is a view similar to FIG. 2 illustrating another embodiment of the invention; and FIG. 8 is a view partly in elevation and partly in transverse section, taken transversely through the structure shown in FIG. 7, illustrating other details.

The same reference numerals throughout the several views indicate the same parts.

Referring first to FIG. 1, there is shown a photographic camera having a main body 1 of suitable known construction, including a film winding or advancing knob 2, a film rewinding knob 3, and a release plunger or trigger 4.

Referring now to FIGS. 2 and 3 in addition to FIG. 1, the front wall 10 of the camera has attached to it the usual casing or housing 12 of an objective shutter, of generally annular cylindrical shape, the annular space within the housing containing the usual base plate or mechanism mounting plate 14 of annular form, from the inner circumference of which the front threaded tube 18 extends forwardly. The shutter speed setting ring 16 is rotatable on the outside of the tube 18 near the forward end thereof, so as to turn about the optical axis of the shutter as a center, and the turning of this speed setting ring 16 serves to adjust the time of exposure in the usual known manner, controlling the speed at which the shutter operating mechanism within the annular part of the shutter housing opens and closes the usual shutter blades mounted in the space just behind the base plate 14. The details of construction of the shutter mechanism, except for the points specifically mentioned below, are not important for purposes of the present invention and may be of any suitable known form.

Fastened to the front of the tube 18 is a stationary bayonet connection ring 20 which serves also as a cover for the front end of the shutter, overlying the shutter speed adjusting ring 16. The ring 20 has at its front end the usual bayonet connection lugs or flanges which mate with bayonet connection lugs or flanges near the rear end of the interchangeable lens and diaphragm unit, which unit is made up of the two main parts 22 and 24 fastened to each other and serving to carry the usual lens elements or components 25, one or both of which may be mounted for axial movement for focusing purposes. In the particular construction here shown, the forward one of the lenses 25 is mounted in a screw threaded sleeve which, upon being rotated by the milled ring at the front of the unit, travels axially forwardly or rearwardly for focusing purposes.

In the space 26 between the two housing parts 22 and 24 of the interchangeable unit, there is mounted a diaphragm or stop comprising the usual iris diaphragm leaves or blades 28, adjusted by an adjusting ring 30 rotatable about the optical axis as a center. The ring has an outwardly extending arm 32 passing through a slot 34 and divided into two parts, one of which extends axially rearwardly a short distance as seen in FIG. 5, the other of which extends forwardly and thence radially outwardly through an arcuate slot to a finger piece by which it can be actuated to adjust the diaphragm.

Movement of the ring 30 and arms 32 in a clockwise direction, when viewed as in FIG. 3, serves to open the diaphragm leaves 28 to a larger aperture, while counterclockwise rotation closes down the aperture of the diaphragm. A spring 36 extending circumferentially and connected at one end to the arm 32 and at the other end to a fixed pin in the housing, tends constantly to turn the ring 30 in a counterclockwise direction and thus to close down the diaphragm aperture, to an extent permitted by engagement of the arm 32 with a radially extending abutment surface 40 on the external diaphragm setting ring 38 which is rotatable circumferentially on the interchangeable lens unit body 22, 24. The periphery of the ring 38 carries the usual diaphragm aperture scale which is read in conjunction with the stationary pointer 42.

In addition to its rotary movement (about the optical axis as a center) for adjusting the preselected aperture of the diaphragm, the setting ring 38 is also displaceable in an axial direction to a limited extent, and is constantly urged rearwardly by the action of springs 44, so as to keep a coupling tooth 46 on the ring 38 in engagement with one or another of the coupling notches 48 formed at the front edge of the externally accessible speed setting ring 50 which is coupled to the internal shutter speed setting ring 16 to turn therewith, by means of a driving tooth 52 on the ring 16, engaging in a notch of the ring 50. Thus there is a detachable coupling between the diaphragm setting ring 38 and the shutter speed setting ring 16, 50, which coupling can be set to various different relative positions of orientation, in accordance with different exposure values to be used when taking pictures under various different conditions of lighting, filter factor, film speed, etc. An exposure value scale 51 is preferably marked circumferentially on the ring 38, in addition to the diaphragm aperture scale, and is read in connection with a reference point or index mark 53 on the speed adjusting ring 50, so that this scale 51 will show the relative positions of the diaphragm aperture and shutter speed adjustments with respect to each other, regardless of the absolute position of either one of them. This variable coupling of the diaphragm aperture adjustment to the shutter speed adjustment, and the use of an exposure value scale in connection therewith, are disclosed, for example, in my copending United States patent application, Serial No. 507,703, filed May 11, 1955 (now Patent 2,887,940, granted May 26, 1959), to which reference is made for such further details as may be desired, although an understanding of further details is not necessary to an understanding of the present invention.

When the camera is to be focused in advance of taking the picture, the diaphragm adjusting ring 30 is turned all the way in a clockwise direction to open the diaphragm to maximum aperture, and according to the present invention it is latched in this open position by mechanism best shown in FIGS. 2 and 3. A latching pin 54, extending parallel to the optical axis, is mounted in the shutter housing for limited axial movement and has its enlarged rear end 56 engaged in a cylindrical guide 58 in a fixed position in the shutter housing, and constantly pressed forwardly by a spring 76. The front end portion 60 of the latching pin projects through a bore 62 in the bayonet connection ring 20 which is stationarily mounted on the front of the shutter and through an arcuate slot (concentric with the optical axis) in the body portion 22 of the interchangeable lens unit, the extreme front end of the latching pin engaging in a latching notch 64 formed in the edge of the diaphragm aperture adjusting ring 30 when this ring is in its position corresponding to maximum aperture opening of the diaphragm. When the pin 54 is withdrawn rearwardly, the aperture adjusting ring 30 can be turned circumferentially, but if the latching pin is not otherwise restrained it will snap forwardly (under the influence of its spring 76) into the notch 64 whenever the aperture adjusting ring 30 reaches its position of maximum aperture, thereby latching the diaphragm in fully open position.

Near the rear end of the pin 54, within the shutter casing, there is a forwardly faced conical shoulder 66 arranged to engage with and be pressed rearwardly by an oblique cam surface 68 of a release pawl 70 pivotally supported in the shutter housing 12 on the pivot pin 72 (FIGS. 2 and 4) so as to swing in a plane perpendicular to the optical axis. The pawl 70 has a lug or arm 74 which extends rearwardly parallel to the optical axis, out the back of the shutter casing and through the front wall 10, to a position within the camera body, where it is suitably connected to the release plunger 4 of the camera in such manner that when the release plunger is depressed to make the exposure, the arm or lug 74 is moved radially inwardly toward the optical axis so as to swing the pawl 70 in a counterclockwise direction on its pivot 72. This movement causes the oblique cam edge 68 of the pawl to react with the conical shoulder 66 of the latching pin 54 to move the latching pin axially rearwardly against the force of its spring 76. Also, near the end of the complete stroke of the pawl 70, this movement of the pawl serves to release or trigger the shutter to open and close the blades to make an exposure, the details of the shutter mechanism itself being unimportant for purposes of the present invention, so that it is sufficient for present purposes merely to understand that the shutter is released or triggered near the end of the counterclockwise swinging movement of the pawl 70.

On the front surface of a radially extending flange of the diaphragm setting ring 38, a double armed pawl 78 is pivotally mounted at 80 and is influenced by a spring 82 tending to swing the pawl counterclockwise on its pivot. The rear arm 84 of the pawl normally engages in a constriction or reduced neck portion 86 near the front end of the latching pin 54, 60, while the other arm 88 of the pawl has an oblique cam surface 90 lying just a little ahead (in a clockwise direction) of the abutment shoulder 40, so that as the arm 32 of the diaphragm adjusting ring 30 swings counterclockwise under the influence of its spring 36, it will engage the cam surface 90 and turn the pawl 78 just before the motion of the arm 32 is stopped by engagement with the abutment 40. This engagement of the arm 32 with the cam 90 will swing the pawl 78 clockwise on its pivot 80, to a sufficient extent to disengage the other arm 84 of the pawl from the reduced neck portion 86 of the pin 54, 60.

This embodiment of the invention operates as follows: On the basis of existing illumination conditions, film speed, and filter factor (if any), the operator sets the diaphragm aperture adjusting ring 38 in the desired position of orientation relative to the shutter speed setting ring 50, by moving the ring 38 forwardly against the force of its spring 44, to uncouple the tooth 46 from the notch 48 and place it in any other desired notch 48, until the proper exposure value of the scale 51 is opposite the reference mark 53. Then the desired diaphragm aperture at which the photograph is to be taken is preselected by turning the ring 38 to bring the desired absolute value of the diaphragm aperture on its scale, opposite the stationary pointer 42, this adjusting motion of the diaphragm aperture preselecting ring 38 serving at the same time to turn the shutter speed adjusting ring 50 (because of the coupling between the two rings) in a complementary manner, so that the exposure value is not changed.

In order now to be able to effect optical focusing of the camera, in the case of a single-lens reflex camera, both the diaphragm leaves or blades and the shutter blades must be opened. The opening of the shutter blades for focusing purposes is effected in a known manner the details of which are not important for purposes of the present invention, the mechanism not being shown in the drawings. In order to open the diaphragm leaves to maximum aperture for focusing, the diaphragm adjusting ring 30 is turned by means of the external finger piece on the arm 32, in a clockwise direction when viewed as in FIG. 3, until the front end of the latching pin 54, 60 snaps into the recess 64 in the diaphragm ring 30, under the influence of the spring 76.

Digital pressure on the finger piece of the arm 32 may now be released, as the latching pin 54, 60 will hold the diaphragm adjusting ring 30 in the fully open position, as long as desired. When focusing is completed and the operator is ready to take the picture, he depresses the release plunger 4 on the camera body which moves the arm 74 to swing the pawl on its pivot 72. By the interaction of the oblique surfaces 68 and 66, this draws the latching pin 54, 60 rearwardly far enough to release the diaphragm ring 30, so that the spring 36 may begin to move the diaphragm ring in a counterclockwise direction to close down the aperture of the diaphragm to the preselected value. However, the engagement of the end 84 of the pawl 78 in the reduced neck 86 of the latching pin, serves to prevent the latching pin from being withdrawn all the way rearwardly at this time, and thus prevents the pawl 70 from completing its stroke far enough to trip or release the shutter mechanism.

Just before the diaphragm adjusting ring 30 reaches the preselected position, the arm 32 engages the oblique cam end 90 of the pawl 78 and swings this pawl to release the other end 84 from the neck portion 86 of the latching pin 54, 60. The latching pin may now be moved further rearwardly, to the end of its stroke, so that the pawl 80 (previously blocked by the intermediate position of the latching pin) is now able to complete its stroke, in the latter part of which it trips or releases the shutter mechanism to operate the shutter to open and close the shutter blades to make the exposure.

Thus when the operator places his finger on the release plunger 4 and presses downwardly to take the picture, there is a momentary dwell or stoppage at an intermediate point of the downward movement of the release plunger. The movement cannot be completed, sufficiently to trip the shutter, until the diaphragm has closed down to the preselected aperture, and it is the closing movement of the diaphragm aperture which releases the shutter tripping parts so that these parts may complete their movement and trip the shutter. In this way, there is absolute assurance that the effective shutter actuation will not take place until the diaphragm has assumed the preselected aperture position.

It will also be noted that this construction is extremely simple and inexpensive, and is also designed in such a way that it does not interfere with placing the interchangeable lens and diaphragm unit on the camera, or taking it off the camera, regardless of the position in which the diaphragm may be set at the moment. As already mentioned, the pin 54, 60 extends through an arcuate slot in the part 22 of the interchangeable unit, and this arcuate slot is long enough to accommodate the pin during the necessary turning movement of the interchangeable unit while engaging or disengaging the bayonet lugs on the interchangeable unit and on the shutter, respectively. If the interchangeable unit happens to be engaged with the shutter while the diaphragm is stopped down to an aperture smaller than its maximum aperture, the axial part of the engaging motion will simply cause the ring 30 to engage the end of the pin 54, 60 and push the pin rearwardly, and the front end of the pin will ride on the rear face of the plate 30 until the next adjusting movement of the diaphragm to maximum aperture, when the pin will snap forwardly into the notch 64.

A slight variation of essentially the same construction is illustrated in FIG. 6, which corresponds to a fragment of FIG. 2 near the rear end of the latching pin 54, 60. In this variation, the rear end 56 of the latching pin, instead of being received in a separate cup-shaped guide 58 (as was the case in FIG. 2) simply extends rearwardly into a guide bore in the shutter mechanism plate 14 or the shutter housing 12 itself, as well seen in FIG. 6. The spring 76, as before, tends to move the latching pin axially forwardly. The operation is exactly the same as previously described.

Another possible embodiment of the invention is shown in FIGS. 7 and 8. In this alternative embodiment, many of the parts are the same in function (although not necessarily the same in detailed shape) as corresponding parts of the previous embodiments, and are simply identified here by the same reference numerals previously used, it being thought that little or no description or additional mention of such parts is needed.

However, in the present embodiment, the latching pin 54, 60 and its pawl 78 are omitted. The diaphragm selecting ring 38 is used the same as before, and is coupled the same as before in various adjustable positions of orientation relative to the shutter speed adjusting ring 50. Likewise, in the present embodiment, the diaphragm aperture adjusting or preseletcing ring 38 has the same abutment 40 as before, for engaging the arm 32a of the diaphragm adjusting ring 30, to determine the extent to which the spring 36 (the same as in the previous embodiment, but not here illustrated) will stop down the diaphragm aperture at the proper time.

The shutter mechanism itself, in this present embodiment, is quite similar to that disclosed in my copending United States patent application, Serial No. 509,929, filed May 20, 1955 (now Patent 2,943,551, granted July 5, 1960), to which reference is made for a more complete explanation of details. However, the following partial explanation will give sufficient information for an understanding of the present invention.

In the shutter housing 12 is a cocking shaft or control shaft 114, arranged parallel to the optical axis and offset laterally from the exposure aperture. This shaft extends out through the rear wall of the shutter and into the camera itself, and is operated and controlled from suitable mechanism within the camera body, the details of which are not important for purposes of the present invention, but which may be constructed, for example, in any one of the various ways disclosed in may copending United States patent applications, Serial No. 514,218, filed June 9, 1955 (now Patent 2,900,885, granted August 25, 1959), or Serial No. 520,875, filed July 8, 1955 (now Patent 2,900,886, granted August 25, 1959), or Serial No. 539,202, filed October 7, 1955 (now Patent 2,849,938, granted September 2, 1958). It is sufficient for purposes of the present invention to say that the various connections within the camera body serve to turn the shaft 114 in a counterclockwise direction (when viewed as in FIG. 8) when cocking or tensioning the shutter, the shaft being latched in its cocked position when the shutter is tensioned, and being released to turn clockwise at the time the exposure is to be made.

At its front end, the shaft 114 has firmly fixed to it a cocking disk 116 having gear teeth 150 extending around most of its periphery. Just behind the disk 116 there is rotatably mounted on the shaft 114 a main driving member or master member 118, having a main drive spring or master spring 120 wound around the shaft 114 and having one end 122 held fast in the shutter housing 12 while the other end 124 is connected to the master member 118 to tend to turn the master member in a clockwise direction. A rearward ear or projection 126 on the cocking disk 116 cooperates with a lug 128 on the master member 118 to turn the master member counterclockwise by the counterclockwise motion of the cocking disk 116 and shaft 114.

The shutter blades 130 are movable in the shutter housing on the pivots 132, the opening and closing movements of the blades when making an exposure being controlled by pins 138 on a shutter blade ring 140 rotatable about the optical axis as a center, these pins 138 engaging in slots 136 in the blades. The blade ring has an outwardly extending arm with two drive pins engaged by various parts of the master member 118 during its clockwise or running down movement, to turn the blade ring 140 first in a counterclockwise direction to open the blades to make an exposure, and then in a clockwise direction to close the blades, swinging them on their pivot pins 132.

Also mounted within the shutter housing and rotatable about the optical axis as a center, is the control ring or release ring 144 preferably rotatable on a bearing on the outside of the front threaded tube 18 of the shutter. A spring 146 tends to turn the ring 144 constantly in a counterclockwise direction. The ring has gear teeth 148 on part of its periphery, meshing with the gear teeth 150 which extend around part of the periphery of the cocking disk 116, so that when the cocking shaft 114 is turned in a counterclockwise direction to cock the shutter, the meshing gear teeth will cause clockwise turning of the control ring 144 against the force of its spring 146. When the cocking shaft 114 is latched in the cocked position, it will hold the ring 144 against return movement. When the master member 118 reaches fully cocked or tensioned position as a result of the counterclockwise turning of the shaft 114 and disk 116, the master member is latched in its tensioned position by a latching pawl 166 rotatably supported on the pivot 168 and having a projection 178 which snaps behind the latching lug 180 of the master member when the latter reaches fully tensioned position. The latching pawl 166 also has a projection 174 riding on the periphery of the ring 144 and engaged by a cam portion 176 of the ring 144 when the latter reaches a certain position, to release the latching pawl 166 from the master member.

The control ring or release ring 144 also has an arm 182 which extends first in a radial direction and then is bent forwardly parallel to the optical axis, passing through a suitable slot 184 in the shutter speed setting ring 16 and through a slot 196 in the front cover member and bayonet connection member 20 of the shutter, and extending further forwardly through a slot in the part 22 of the interchangeable lens and diaphragm unit, so as to lie in the plane of movement of the arm 32a of the diaphragm aperture setting ring 30, which is the arm which cooperates with the preselection stop 40 on the diaphragm preselecting or setting ring 38.

As in the previous construction, the diaphragm ring 38 is coupled to the shutter speed ring 50 in any desired position of relative orientation, depending upon the exposure value, and the ring 38 and ring 50 thereafter rotate together as a unit, until a new coupling at a new exposure value is effected. When the camera is to be focused, the shutter is cocked. The counterclockwise turning of the cocking shaft 114 turns the ring 144 in a clockwise direction, so that the arm 182 thereof engages the arm 32a of the diaphragm adjusting ring 30, and turns the latter ring against the force of its spring 36 to open the diaphragm to maximum aperture. This is the position shown in dot dash lines in FIG. 8. Then when the focusing operation has been completed and the exposure is to be made, the cocking shaft 114 is turned in the opposite or clockwise direction, but the master member remains for the time being in its fully tensioned position, held by the latch 166, 178. The clockwise turning of the shaft 114 turns the control ring 144 counterclockwise, so that the arm 182 thereof moves counterclockwise from the position shown in dot dash lines in FIG. 8 to the position shown in full lines. During this movement, the arm 32a of the diaphragm control ring 30 follows along with the arm 182 (under the influence of the spring 36) until it comes into engagement with the preselection stop 40 on the diaphragm setting ring 38, whereupon the diaphragm setting ring 30 stops but the ring 140 and arm 182 continue onward to rest position.

Shortly before the ring 144 reaches its rest position, the cam 176 thereon engages the end 174 of the latching pawl 166 to release the end 178 of the latching pawl from the portion 180 of the master member 118. The master member is then driven in a clockwise direction by its main driving spring 120, to cause the desired opening and closing movement of the shutter blades 130 to make the exposure.

Of course when the diaphragm blades are fully opened for focusing, the shutter blades 130 are likewise fully opened, by suitable mechanism which is not shown here because it does not constitute part of the present invention.

It will be noted that in this embodiment of the invention, as well as in the previous embodiments, the exposure cannot take place until the diaphragm aperture has been stopped down to its preselected value. The exposure cannot occur until the cam 176 moves the latching pawl 166, and this in turn cannot occur until just before the control ring 144 reaches its normal rest position, at which time the arm 32a of the diaphragm setting ring 30 is no longer held by the arm 182 and has been returned to its preset or preselected position by the force of its own spring 36. Also it may be noted that this embodiment of the invention, like the previous embodiment, does not interfere with placing the interchangeable lens and diaphragm unit on the shutter in any particular position to which the diaphragm may be adjusted at the time of such placement. It is desirable for this purpose to arrange the bayonet lug parts on the shutter and on the interchangeable unit so that the turning motion of placing the interchangeable unit on the shutter is a turning in a leftward or counterclockwise direction. The range of rotary movement of the parts is such that, when the preselection stop 40 on the diaphragm ring 38 is moved to its maximum counterclockwise position, for smallest aperture, it still lies to the right or in a clockwise direction from the rest position of the arm 182. Therefore, no matter in what position of adjustment the diaphragm may be, the interchangeable unit can always be applied to the shutter and secured thereto by a leftward turning motion, with assurance that the arm 32a will lie in proper relation to the arm 182 of the shutter unit and there will be a proper operative connection between the parts of the shutter unit and the parts on the interchangeable lens and diaphragm unit, with no necessity for taking any special pains to have the diaphragm adjusted to a particular value at the time the unit is placed on the camera. All forms of the invention provide a particularly simple and inexpensive manner of connecting the diaphragm aperture preselection mechanism of the interchangeable unit, to the shutter operating mechanism of the shutter unit, in such a way that the diaphragm, even though mounted in a separate unit from the shutter, will always be stopped down to its preselected aperture value before the exposure is made by the shuter, and cannot be accidentally left in the fully open focusing position when the exposure is made.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

This application is a division of my application filed September 27, 1956, Serial No. 612,465, now Patent 2,967,472, granted January 10, 1961.

What is claimed is:

1. A photographic camera including a shutter unit having an optical axis, an interchangeable lens unit attachable to and detachable from said shutter unit, said lens unit having an adjustable diaphragm, a diaphragm aperture adjusting member rotatably mounted on said lens unit for movement through a range between maximum aperture and minimum aperture positions, a spring tending to turn said adjusting member in a direction toward one limit of its range of movement, a preselection stop member adjustably mounted in cooperative relation to said aperture adjusting member for controlling the extent to which said spring may turn said adjusting member in said direction, an exposure controlling member mounted on said shutter unit and movable through a predetermined range of travel in one direction to cause an exposure, said exposure controlling member including a ring rotatable about the optical axis of the shutter unit, and means operatively connected to said exposure controlling member and passing from said shutter unit into said lens unit for engaging and holding said aperture adjusting member at an aperture different from that determined by said preselection stop member, until said exposure controlling member moves part way through its said predetermined range of travel, said means passing from said shutter unit into said lens unit including an arm on said ring for engaging said aperture adjusting member when said ring is in one position, to hold said aperture adjusting member in a position different from that determined by said preselection stop member, and for releasing said adjusting member as said ring moves toward another position, so that said spring may move said adjusting member in a direction toward said preselection stop member.

2. A photographic camera including a shutter unit having an optical axis, an interchangeable lens unit attachable to and detachable from said shutter unit, said lens unit having an adjustable diaphragm, a diaphragm aperture adjusting member rotatably mounted on said lens unit for movement through a range between maximum aperture and minimum aperture positions, a spring tending to turn said adjusting member in an aperture-reducing direction, a preselection stop member adjustably mounted in cooperative relation to said aperture adjusting member for controlling the extent to which said spring may turn said adjusting member in said aperture-reducing direction, an exposure controlling member mounted on said shutter unit and movable through a predetermined range of travel in one direction to cause an exposure, said exposure controlling member including a ring rotatable about the optical axis of the shutter unit, and means operatively connected to said exposure controlling member and passing from said shutter unit into said lens unit for engaging and holding said aperture adjusting member at an aperture different from that determined by said preselection stop member, until said exposure controlling member moves part way through its said predetermined range of travel, said means passing from said shutter unit into said lens unit including an arm on said ring for engaging said aperture adjusting member when said ring is in one position, to hold said aperture adjusting member in a position different from that determined by said preselection stop member, and for releasing said adjusting member as said ring moves toward another position, so that said spring may move said adjusting member in a direction toward said preselection stop member.

3. A photographic camera of the type comprising a shutter unit and an interchangeable optical unit detachably secured to each other in operative position alined with a common optical axis, said optical unit including an adjustable diaphragm having a variable aperture, a diaphragh aperture adjusting ring rotatable about said optical axis through a limited range of rotary movement between maximum aperture position at one end of its range of movement and minimum aperture position at the opposite end of its range of movement, and spring means tending to rotate said ring toward one end of its range of movement, said shutter unit including movable shutter blades, a rotary master member movable from a rest position to a tensioned position to cock the shutter ready for an exposure and movable in reverse direction from tensioned position to rest position to open and close said shutter blades to make an exposure, a releasable latch for latching said master member in tensioned position, a control ring mounted in said shutter unit for rotation about said optical axis through a limited range between a rest position and a shutter-cocked position, and cooperating means on said latch and said control ring for releasing said latch during the latter part of movement of said control ring from shutter-cocked position to rest position, said camera further including a diaphragm aperture preselection ring mounted on one of said units for rotation about said optical axis and having a portion lying in the path of travel of a portion of said diaphragm aperture adjusting ring to limit the extent to which said spring means may rotate said adjusting ring toward one end of its range of movement, said camera being characterized by the improvement that said control ring mounted in said shutter unit has an arm extending therefrom into said optical unit and engaging therein a portion of said diaphragm aperture adjusting ring as said control ring turns from rest position to shutter-cocked position, thereby to turn said aperture adjusting ring against the force of said spring means and to hold said aperture adjusting ring substantially at the end of its range of movement opposite to the end toward which said spring means tends to rotate it, so long as said control ring remains in shutter-cocked position.

4. A photographic camera including a shutter unit and an interchangeable lens unit attachable to and detachable from said shutter unit, said lens unit including a diaphragm aperture adjusting member mounted for rotation in said lens unit and a spring tending to turn said aperture adjusting member in one direction, said shutter unit including a blade-operating master member mounted for rotation in said shutter unit and a master spring tending to turn said master member in one direction to make an exposure and a releasable latch for holding said master member in a tensioned position to prevent it from turning by the power of said master spring, characterized by the novel feature that there is a control member mounted in said shutter unit for rotation therein and having an arm extending out of said shutter unit and into said lens unit in position to engage the aperture adjusting member in the lens unit and to turn the adjusting member against the force of its spring when the control member is turned in one direction and to release the adjusting member for movement by the force of its spring when the control member is turned in the opposite direction, and a portion on said control member for releasing said latch of said master member by movement of said control member in said opposite direction in timed relation to the movement of said arm which engages the aperture adjusting member.

5. A construction as defined in claim 4, further characterized by the fact that said control member has a main portion of annular ring-shaped form enclosed within and rotatable with respect to said shutter unit, and by the fact that said arm which extends out of said shutter unit and into said lens unit is a substantially rigid arm integral with the ring-shaped main portion of said control member.

References Cited in the file of this patent

UNITED STATES PATENTS

| 2,311,822 | Frankel | Feb. 13, 1943 |
| 2,319,304 | Dalotel | May 18, 1943 |
| 2,777,371 | Schutz | Jan. 15, 1957 |

FOREIGN PATENTS

| 1,106,716 | France | July 27, 1955 |